(12) United States Patent
Murdick et al.

(10) Patent No.: US 8,997,260 B2
(45) Date of Patent: Mar. 31, 2015

(54) INTEGRATED MICROSCOPE AND RELATED METHODS AND DEVICES

(76) Inventors: Ryan Murdick, Ann Arbor, MI (US); Lukas Novotny, Pittsford, NY (US)

(*) Notice: Subject to any disclaimer, the term of this patent is extended or adjusted under 35 U.S.C. 154(b) by 0 days.

(21) Appl. No.: 14/000,895

(22) PCT Filed: Feb. 23, 2012

(86) PCT No.: PCT/US2012/026304
§ 371 (c)(1),
(2), (4) Date: Aug. 22, 2013

(87) PCT Pub. No.: WO2012/116168
PCT Pub. Date: Aug. 30, 2012

(65) Prior Publication Data
US 2013/0333077 A1    Dec. 12, 2013

Related U.S. Application Data

(60) Provisional application No. 61/445,668, filed on Feb. 23, 2011.

(51) Int. Cl.
*G01Q 60/18* (2010.01)
*G01Q 30/02* (2010.01)
*B82Y 35/00* (2011.01)

(52) U.S. Cl.
CPC .............. *G01Q 30/025* (2013.01); *B82Y 35/00* (2013.01)
USPC .................................. 850/30; 850/21; 850/33

(58) Field of Classification Search
USPC .................... 850/21, 22, 24, 30, 33
See application file for complete search history.

(56) References Cited

U.S. PATENT DOCUMENTS

| | | |
|---|---|---|
| 5,237,238 A | 8/1993 | Berghaus et al. |
| 5,929,992 A | 7/1999 | Stenton et al. |
| 7,183,548 B1 | 2/2007 | Kley |
| 5,237,238 C1 | 9/2008 | Berghaus et al. |
| 7,526,158 B2 | 4/2009 | Novotny et al. |
| 7,591,858 B2 | 9/2009 | Keilmann et al. |
| 7,738,115 B2 | 6/2010 | Ocelic et al. |
| 7,978,343 B2 | 7/2011 | Sun et al. |
| 2003/0103263 A1 | 6/2003 | Engelhardt et al. |
| 2008/0266557 A1 | 10/2008 | Sokolov et al. |
| 2010/0218287 A1 | 8/2010 | Nakata et al. |
| 2010/0230590 A1* | 9/2010 | Bierhoff et al. ............... 250/310 |
| 2010/0245816 A1 | 9/2010 | Shen et al. |

(Continued)

FOREIGN PATENT DOCUMENTS

| | | |
|---|---|---|
| EP | 2 360 481 A1 | 8/2011 |
| JP | 2006 250623 A | 9/2006 |
| WO | WO 2010/007452 A2 | 1/2010 |

OTHER PUBLICATIONS

Pan, S.H. et al., 3He Refrigerator Based Very Low Temperature Scanning Tunneling Microscope, Review of Scientific Instruments, vol. 70, No. 2, Feb. 1999, pp. 1459-1463.

(Continued)

*Primary Examiner* — Nicole Ippolito
*Assistant Examiner* — Hanway Chang
(74) *Attorney, Agent, or Firm* — Reising Ethington PC (57) ABSTRACT

An embodiment includes an integrated microscope including scanning probe microscopy (SPM) hardware integrated with optical microscopy hardware, and other embodiments include related methods and devices.

22 Claims, 9 Drawing Sheets

(56) References Cited

U.S. PATENT DOCUMENTS

2010/0325761 A1* 12/2010 Nakata et al. .................. 850/33
2012/0005793 A1 1/2012 Ocelic

OTHER PUBLICATIONS

Soft dB, SPM Open Source Controller Model Mk2-A810, DSP-based system for Scanning Probe Microscopy (SPM) applications, Signal Ranger DSP, 2 pages.
Nanosurf® Saphyr, Your Ultimate "Laboratory-in-a-Box" Signal Analyzer/Controller, www.nanosurf.com/saphyr, 4 pages.
ASC500 SPM Controller, attoControl, Attocube Systems AG, 8 pages.
NanoPositioning, Ultra Compact Positioners for Extreme Environments, Attocube Systems AG, 12 pages.
HF2 Lock-in Amplifier, 2 Input Channel, Lock-in Amplifier, Zurich Instruments, Product Specification, Aug. 2009, 2 pages.
HF2 Real-time Kit, HF2 Series Programming Environment, Zurich Instruments, Product Specification, Aug. 2009, 2 pages.
HF2 Current Amplifier, Differential Current Amplifier, Zurich Instruments, Product Specification, Aug. 2009, 2 pages.
HF2 Impedance Spectroscope, 2 Input Channel, Multi-frequency Impedance Spectroscope, Zurich Instruments, Product Specification, Aug. 2009, 2 pages.
9 SPM Control System, Hardware Configuration Ver. 1.0, RHK Technology, 2 pages.
Pan Style SPM Scan Head with Integral X-Y Offsets, RHK Technology, 2 pages.
PLLPro 2 AFM Control System, RHK Technology, 4 pages.
R9 Preview, New Standard in AFM/STM Control Systems, RHK Technology, 4 pages.
PLLPro™, Universal AFM Control Platform, The Next-Generation Universal AFM Control Platform for Serious SPM Research, RHK Technology, 8 pages.
SPM 1000, SPM Control System, Legendary Universal Controller with XPMPro™ Software, RHK Technology, 16 pages.
International Search Report and Written Opinion, International Application No. PCT/US2012/026304, Filing Date—Feb. 23, 2012, Mailing Date—Sep. 27, 2012, 11 pages.

\* cited by examiner

INTEGRATED MICROSCOPE AND RELATED METHODS AND DEVICES

STATEMENT REGARDING FEDERALLY SPONSORED RESEARCH OR DEVELOPMENT

This invention was made with U.S. Government support under Contract Number FA9550-11-C-0025. The U.S. Government has certain rights in this invention.

TECHNICAL FIELD

This disclosure relates generally to microscopy techniques and apparatus and, more particularly, to scanning probe microscopy and equipment.

BACKGROUND

Scanning probe microscopy (SPM) is a technique that scientists use to analyze a sample material by monitoring interaction between a probe and the material. For example, atomic force microscopes (AFM) measure attractive and repulsive forces between a tip of a cantilevered probe and a material surface, both perpendicular or normal to the surface and parallel or lateral to the surface. Such forces can be displayed in image form as a function of the position of the tip as it scans across the surface of the material.

Raman spectroscopy is a technique where a light beam is directed onto a sample material surface to induce an inelastic conformational change of underlying atoms, causing the atoms to emit photons that are of the same energy of that lost (or gained) from the irradiated beam. The photons can be dispersed according to wavelength onto a CCD screen, forming the Raman spectrum, which is has characteristic peaks based on what type of atomic bonds are present in the sample. The spatial resolution of Raman spectroscopy is approximately equal to the focal spot size, which is approximately half of the wavelength.

Tip-enhanced Raman Spectroscopy (TERS) is a technique where light is focused into a junction between an SPM probe tip and a sample material, where a strong field enhancement amplifies a photon signal coming out of the junction. This results in greater spatial resolution as the limiting factor is the probe apex diameter rather than a confocal limit.

BRIEF SUMMARY

One illustrative embodiment includes an integrated microscope including scanning probe microscopy (SPM) hardware integrated with optical microscopy hardware, and other embodiments include related methods and devices.

BRIEF DESCRIPTION OF THE DRAWINGS

Features and advantages of one or more of the disclosed embodiments of this disclosure will be apparent to those of ordinary skill in the art from the following detailed description of illustrative embodiments and the claims, with reference to the accompanying drawings in which:

DETAILED DESCRIPTION

In general, a microscope, related method of use, and apparatus will be described using one or more illustrative embodiments. The example embodiments will be described with reference to their use in a scanning probe microscopy environment. However, it will be appreciated as the description proceeds that the inventions are useful in many different applications and may be implemented in many embodiments.

This application claims the benefit of U.S. Provisional Application No. 61/445,668, filed Feb. 23, 2011, and the benefit of PCT Application PCT/US12/26304, filed Feb. 23, 2012, and the contents of said applications are incorporated herein by reference in their entireties.

Figures 1, 10:
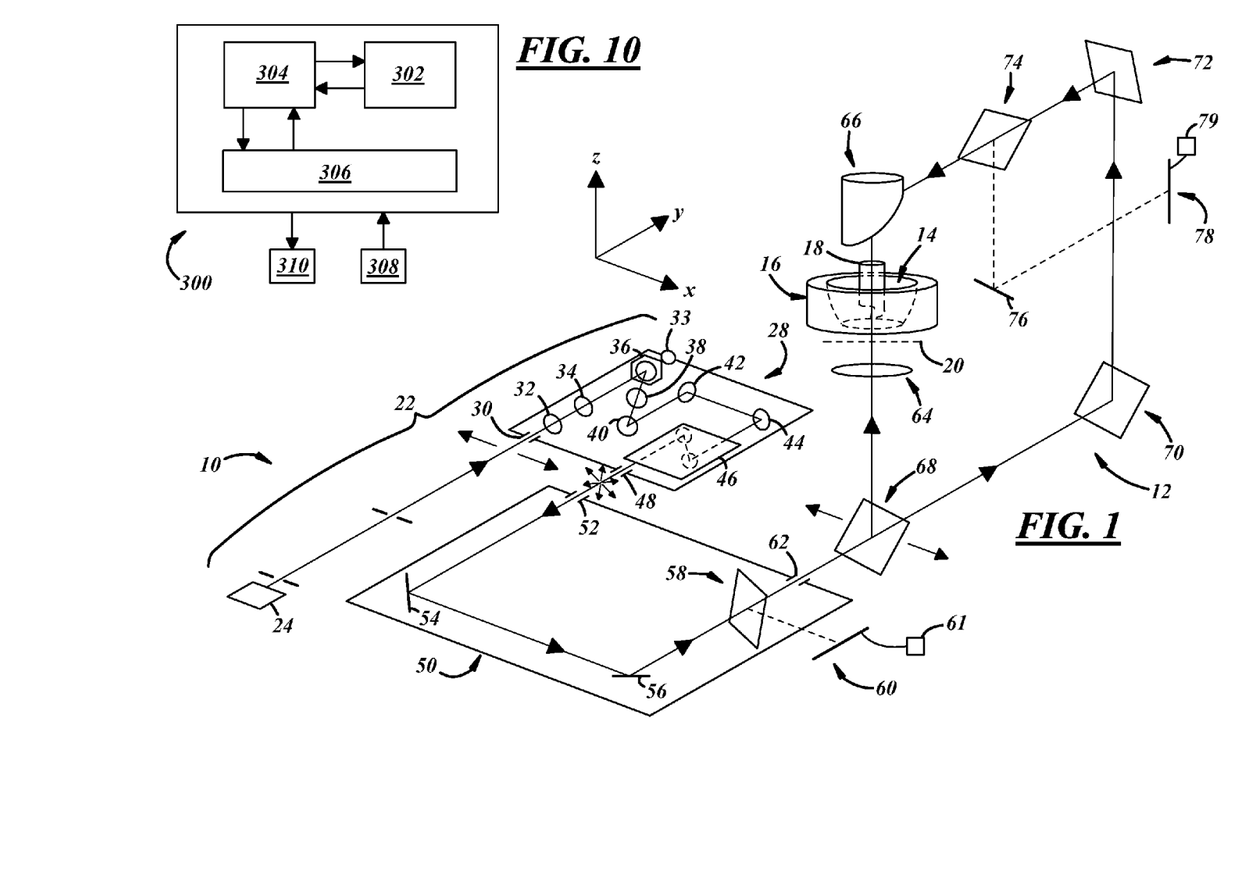
FIG. 1 is a schematic view of an illustrative embodiment of a microscope.
FIG. 10 is a schematic view of an illustrative computing apparatus that may be in communication with the microscope of FIG. 1 to carry out one or more disclosed methods.

Referring specifically to the drawings, FIG. 1 schematically illustrates an illustrative embodiment of a microscope 10 that includes optical microscopy hardware 12 that may be used to carry out optical microscopy techniques, and/or to facilitate or augment scanning probe microscopy (SPM) techniques, and that also includes SPM hardware 14 that is integrated with the optical microscopy hardware 12. For example, the optical microscopy hardware 12 includes a peripheral optic 16, and the SPM hardware includes an SPM scanning head 18 disposed within the peripheral optic 16. The optical microscopy techniques may include far-field optical microscopy, and the SPM techniques may include confocal and near-field optical SPM techniques.

The SPM hardware 14 may include the SPM scanning head 18 depending down into the peripheral optic 16, and an SPM scanning stage 20 disposed below the peripheral optic 16 for supporting a material under investigation within the peripheral optic 16. The SPM scanning head 18 may include a cantilevered probe head, a tuning fork probe head, or any other suitable type of SPM scanning head. The SPM scanning stage 20 may include an X-Y stage, an X-Y-Z stage, or any other suitable type of SPM scanning stage. In one example, the SPM scanning stage 20 may be a Nano-LP nanopositioner available from Mad City Labs, of Madison, Wis. The SPM scanning stage 20 and the SPM scanning head 18 may include one or more nanopositioners, for instance, piezoelectric elements, and/or any other suitable nanopositioning devices.

The optical microscopy hardware may include a light beam source 22. For example, the light beam source 22 may include an origin 24 to initiate and emit a light beam, and/or a mode conversion and beam expansion (MCBE) module 28 optically downstream of the origin 24 that may receive the light beam from the origin 24, process the light beam, and transmit a processed light beam downstream. As will be described in more detail below, the optical microscopy hardware 12 also may include various other optics to receive the light beam from the upstream MCBE module 28, transmit the light beam to a material under investigation, transmit light reflected from the material, and collect the reflected light according to any suitable techniques for any suitable analysis.

For instance, the techniques and analysis may include spectroscopy and/or imaging. Examples of spectroscopy include confocal Raman spectroscopy, infrared absorption/extinction spectroscopy, and/or fluorescence/photoluminescence spectroscopy. Examples of imaging include confocal atomic force microscopy (AFM) and scanning tunneling microscopy. Other examples include near-field optical SPM techniques and analysis including tip-enhanced Raman spectroscopy (TERS), and/or apertureless near-field scanning optical microscopy (a-NSOM). Any other suitable optical and/or SPM techniques and/or analyses may be used. The microscope 10 may enable a combination of many techniques onto one platform, may have the versatility of carrying out investigation of transparent and/or opaque sample materials, and may provide sufficient degrees of freedom for probe tip and/or sample material to allow for the most effective use of the various techniques.

The light source origin 24 may include a laser. The origin 24 may include any suitable device to initiate and emit a light beam, for instance, that provides incident light in the visible through mid-infrared spectrum.

The MCBE module 28 may be used to improve one or more qualities of the light beam received from the origin 24. For example, the MCBE module 28 may receive an input light beam that is linearly polarized, of relatively small diameter, for example 3-6 mm diameter, and/or of non-uniform intensity. Accordingly, the MCBE module 28 may process that beam to produce an output light beam that is radially polarized, of expanded diameter for example 4-6 mm diameter for transmission mode illumination, and 15-20 mm diameter for reflection mode illumination, and/or that is spatially filtered. The radially polarized light may be provided to minimize extinction of light by the SPM scanning head 18 within the peripheral optic 16. The MCBE module 28 may include an inlet aperture 30, a first alignment iris 32, a second alignment iris 33, and a mode converter 34 downstream of the iris 32 to convert the light beam from linear polarize mode to radial polarized mode. The mode converter 34 may be removed to allow the location of the mode converter 34 to be aligned with the beam, using the first and second alignment irises 32, 33. The MCBE module 28 also may include a first off-axis parabolic mirror 36 (e.g. 30°) downstream of the mode converter 34 communicate the polarized light in an optically downstream direction, a pinhole aperture 38 downstream of the mirror 36, and a second off-axis parabolic mirror 40 (e.g. 30°) downstream of the pinhole aperture 38 to further communicate the polarized light in an optically downstream direction. The MCBE module 30 further may include a first steering mirror 42 downstream of the mirror 40, a second steering mirror 44 downstream of the first steering mirror 42, a reflective beam expander 46 downstream of the second steering mirror to expand the light beam to a desired size, and an outlet aperture 48. The expander 46 may be suitable for use with infrared light.

Although specific examples have been provided, the light beam source 22 may include any other suitable device(s) to initiate and emit a light beam that is suitable for use with SPM/optical integrated microscopy. Also, some or all of the various elements of the MCBE module 28 described above need not be incorporated into the separate module and could be stand alone elements or incorporated into other modules, sub-modules, or the like.

The other optics may include a beam steering module 50 optically downstream of the MCBE module 28 to receive the light beam from the upstream MCBE module 28, steer the light beam, and transmit the steered light beam downstream. The beam steering module 50 may receive the output beam from the MCBE module 28 and may steer the beam for the purpose of aligning the beam precisely within the peripheral optic 16. The beam steering module 50 may include an inlet aperture 52 to receive the beam from the MCBE module 28, a first steering mirror 54 downstream of the inlet aperture 52 to steer the inlet beam, and a second steering mirror 56 downstream of the mirror 54 to further steer the beam. The beam steering module 50 also may include a first collection mirror 58 for collection of a light beam during a transmission mode, a collection optic or collector 60 downstream of the mirror 58, and an outlet aperture 62 downstream of the collector 60. The mirror 58 may include a dichroic mirror, and the collector 60 may be a fiber optic collector including a fiber optic output for transmission to one or more light or imaging sensors 61, like avalanche photo diodes (APDs), charge coupled devices (CCDs), or the like for analysis. Some or all of the various elements described above need not be incorporated into the separate module and could be stand alone elements or incorporated into other modules, sub-modules, or the like.

The other optics also may include the peripheral optic 16 and one or more of the following optics. An optic 64 may be disposed on a first side of the peripheral optic, for example, below the optic 16. The optic 64 may be movable or nanopositionable along the Z axis as will be described herein below. The optic 64 may include a transmissive objective, which may include a lens that may be focusable. Another optic 66 may be disposed on a second side of the peripheral optic 16, for example, above the peripheral optic 16. The optic 66 may include a reflective objective, for instance, an off-axis parabolic mirror or any other suitable reflective optic. An illumination mode mirror 68 may be disposed on the first side of the peripheral optic 16 optically downstream of the second steering mirror 56 in a first side or transmission illumination path upstream of the transmissive objective 64. The mirror 68 may be in optical communication with the optic 64 in a transmission illumination mode of the microscope 10, and removable or movable out of such communication in a reflection illumination mode of the microscope 10. The illumination mode mirror 68 may be disposed optically upstream of the first collection mirror 58 in a first side or transmission collection path. A first periscope mirror 70 may be disposed optically downstream of the illumination mode mirror 68 in a second side illumination path, and a second periscope mirror 72 may be disposed optically downstream of the first periscope mirror 70 along the second side illumination path in optical communication with the reflective optic 16 for the reflection illumination mode. The first periscope mirror 70 may be pivotable about an axis A that extends along its reflective surface and that is perpendicular to the second side illumination path. The second periscope mirror 72 may be translatable along the second side illumination path. A second collection mirror 74 may be disposed in a second side or reflection collection path for collection of a light beam during a reflection mode, wherein the reflective optic 66 may be disposed optically between the peripheral optic 16 and the second collection mirror 74. A third collection mirror 76 may be disposed in the reflection collection path in downstream optical communication with the second collection mirror 74, and a second collector 78 may be disposed downstream of the mirrors 74, 76.

The mirror 74 may include a dichroic mirror, and the collector 78 may include a fiber optic output for transmission to one or more light or imaging sensors 79, like avalanche photo diodes (APDs), charge coupled devices (CCDs), or the like for analysis.

In accordance with the various embodiments of the microscope 10, one or more methods of using the microscope 10 may be carried out, according to one or modes of operation. For example, the microscope 10 may be operated according to a transmission illumination mode for focusing on or scoping a transparent material, and a reflection illumination mode for focusing on or scoping at least one of the transparent material or an opaque material. More specifically, the light beam source 22 may be activated in any suitable manner, and the light beam may be steered by the beam steering module 50. The illumination mode mirror 68 either may be positioned in operational place and used according to a transmissive illumination mode to direct the light beam along the first side illumination path to illuminate the first side of the material under investigation, or may be removed from its operational place according to a reflective illumination mode to direct the light beam along the second side illumination path through the periscope optics to illuminate the second side of the material under investigation.

In another example, the microscope 10 may be operated according to a dual- or multiple-collection-mode, including activating the first side illumination path, and simultaneously activating the first and second side collection paths. More specifically, the collection paths may be activated in any suitable manner, for example, by activating the collectors 60, 78 to collect the light reflected from, or transmitted through, the material under investigation. The dual-collection-mode may be carried out when scoping a transparent substrate. For example, the illumination mode mirror 68 may be placed as shown in FIG. 1 in optical communication between and with the mirror 56 and the objective 64.

Figure 2:
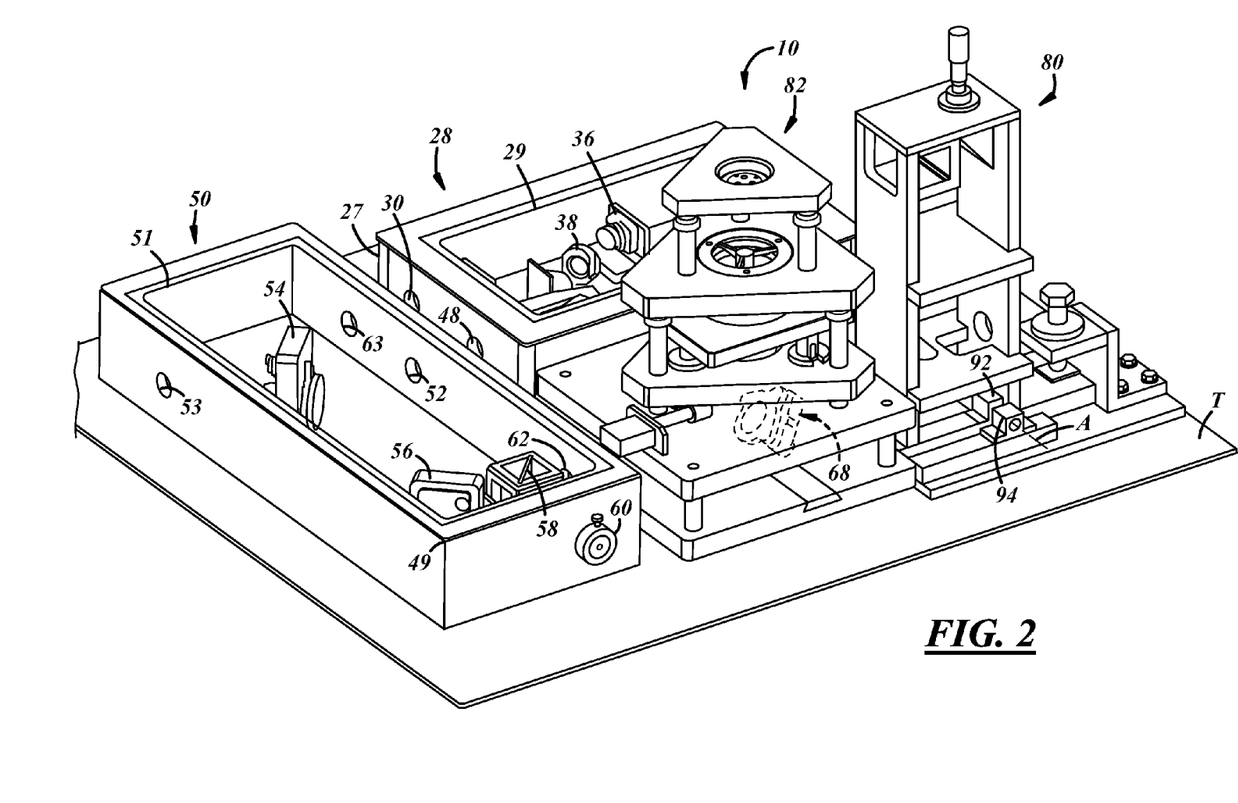
FIG. 2 is a perspective view of illustrative hardware corresponding the microscope of FIG. 1.

Referring now to FIG. 2, illustrative hardware for the microscope 10 is illustrated according to one illustrative implementation. The microscope 10 may include the MCBE module 28, the beam steering module 50, a periscope tower 80, and a scanning tower 82. The MCBE module 28 may include a housing that may include an open-top box or frame 27 and a cover 29 for the frame 27 that may be transparent. The housing may include the inlet and outlet apertures 30, 48. Likewise, the beam steering module 50 may include a housing that may include an open-top box or frame 49 and a cover 51 for the frame 49 that may be transparent. The housing may include the inlet and outlet apertures 52, 62, and pass through apertures 53, 63. The towers 80, 82 will be described in more detail below.

The periscope tower 80 may receive the light beam along the second side illumination path, transmit the light beam to the scanning tower 82, and receive reflected light transmitted from the scanning tower 82 along the second side collection path. The periscope tower 80 may carry the pivotable mirror 70, the translatable mirror 72, the second collection mirror 74, and the third collection mirror 76.

Figure 3:
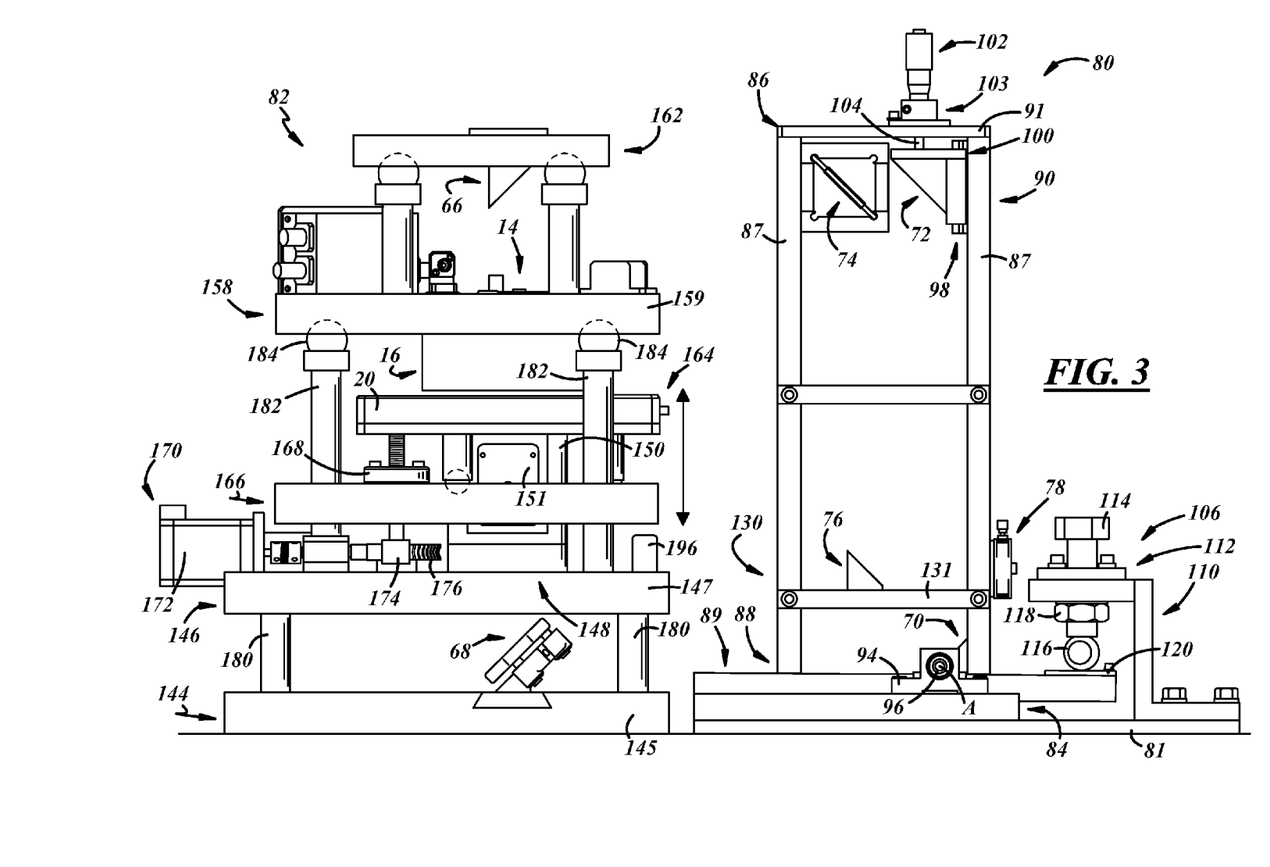
FIG. 3 is an elevational view of illustrative hardware corresponding to the microscope of FIG. 1.
Figure 4:
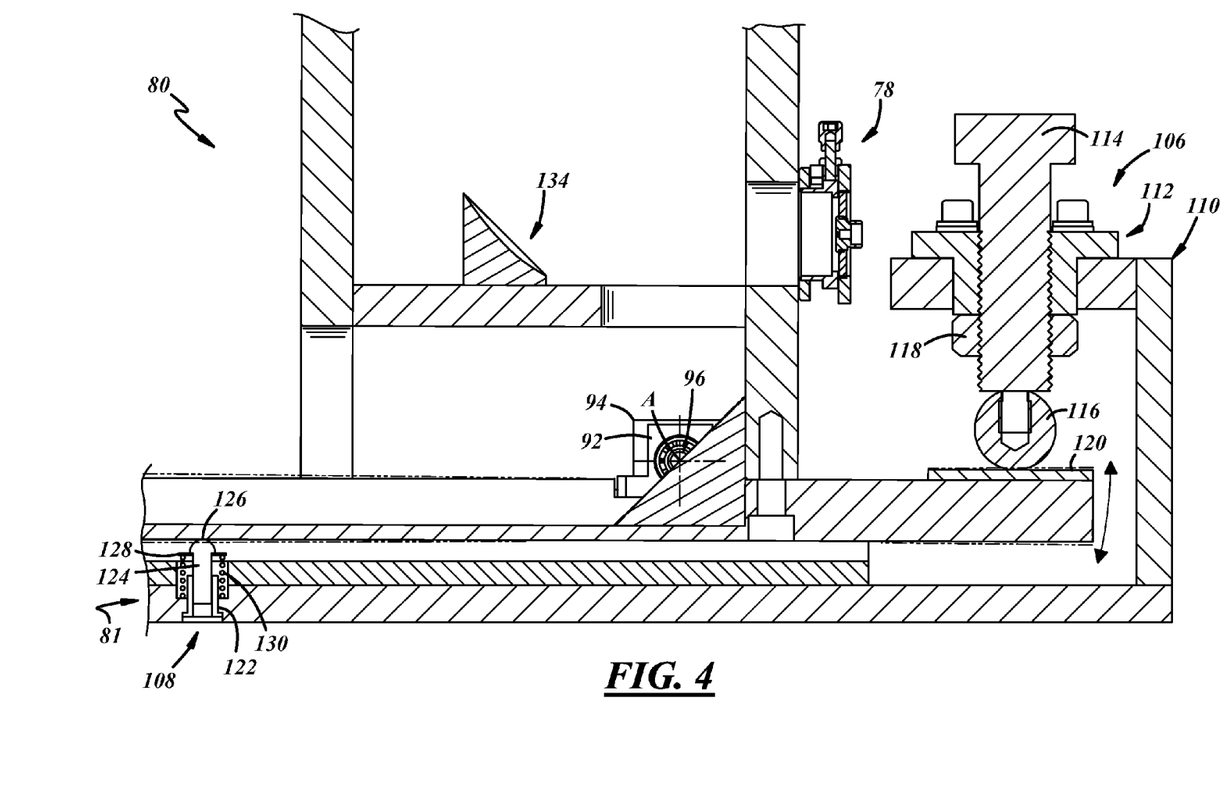
FIG. 4 is a fragmentary perspective view of a periscope tower of the hardware shown in FIGS. 2 and 3.

Referring to FIGS. 3 and 4, the periscope tower 80 may include a tower base 84, a frame 86 that may be pivotably coupled to the base 84 and that may include uprights 87, a first level 88 that may include a frame base 89 that may be coupled in any suitable manner to the uprights 87, and a second level 90 above the first level 88 that may include a second level member or plate 91 that may be coupled to and between the uprights 87 in any suitable manner. The tower 80 also may include a mounting plate 81 that may support the tower base 84 from underneath the tower base 84. The first periscope mirror 70 may carried by the frame 86 in any suitable manner at the first level 88 and has a reflective surface. The frame base 89 that may be pivotable with respect to the tower base 84 about an axis A extending along the reflective surface of the first periscope mirror 70 and transverse to the second side illumination path. For example, the tower 80 may include bearing blocks 92 that may be coupled to the tower base 89, corresponding bearing blocks 94 coupled to the frame base 84, and shafts 96 extending along the axis A between respective bearing blocks on either side of the mirror 70.

The second periscope mirror 72 may be carried by the frame 86 on the second level and may be movably coupled to the frame 86 in a direction toward and away from the first periscope mirror 70 so as to be translatable along the second side illumination path. For example, the tower 80 may include a linear slide 98 coupled to a portion of the frame 86, a mirror support 100 carrying the second periscope mirror 72 and slidably coupled to the linear slide 98. Also, a micropositioner 102 may be coupled to another portion of the frame 86, for example to the plate 91 by a coupling 103, and may have an actuator 104 coupled to the mirror support 100 to adjust movement of the second periscope mirror 72. The micropositioner 102 may include a micrometer barrel.

With reference to FIG. 4, the periscope tower 80 also may include a frame pivot adjuster 106 to impose an adjustment force on a portion of the frame 86 on one side of the axis A, and a preloader 108 to impose a bias force on another portion of the frame 86 on another side of the axis A. Accordingly, pivoting of the frame 86 may be adjusted easily so that the rest of the optics of the tower 80 are adjusted along with adjustment to the first periscope mirror 70. The frame pivot adjuster 106 may include a support 110, an internally threaded member 112 that may be integral with or coupled to the support 110, an externally threaded member 114 threadingly received in the internally threaded member 112, a spherical engagement member 116 that may be integral with or coupled to the externally threaded member 114, and a stop collar 118 that may be integral with or coupled to the externally threaded member 114. A separate wear plate 120 may be coupled to the base 89 of the frame 86 to engage the spherical engagement member 116.

In one implementation, the preloader 108 may include a sleeve 122 that may be carried in the mounting plate 81, for example, in a counterbored passage therein, and a plunger that may include a shaft 124 carried in the sleeve 122 and extending through a passage in the tower base 84 and terminating in a head 126 for engagement with an undersurface of the pivotable frame base 89. The preloader 108 also may include a washer 128 disposed below the head 126 of the plunger, and a spring 130 disposed between the mounting plate 81 and the frame base 89 and engaged with the washer 128 to impose a bias force on the frame base 89. The preloader 108 also or instead may include any other types of springs and/or spring and plunger arrangements, or any other device (s) suitable to impose a force on the frame 86 about the axis A.

Figure 4A:
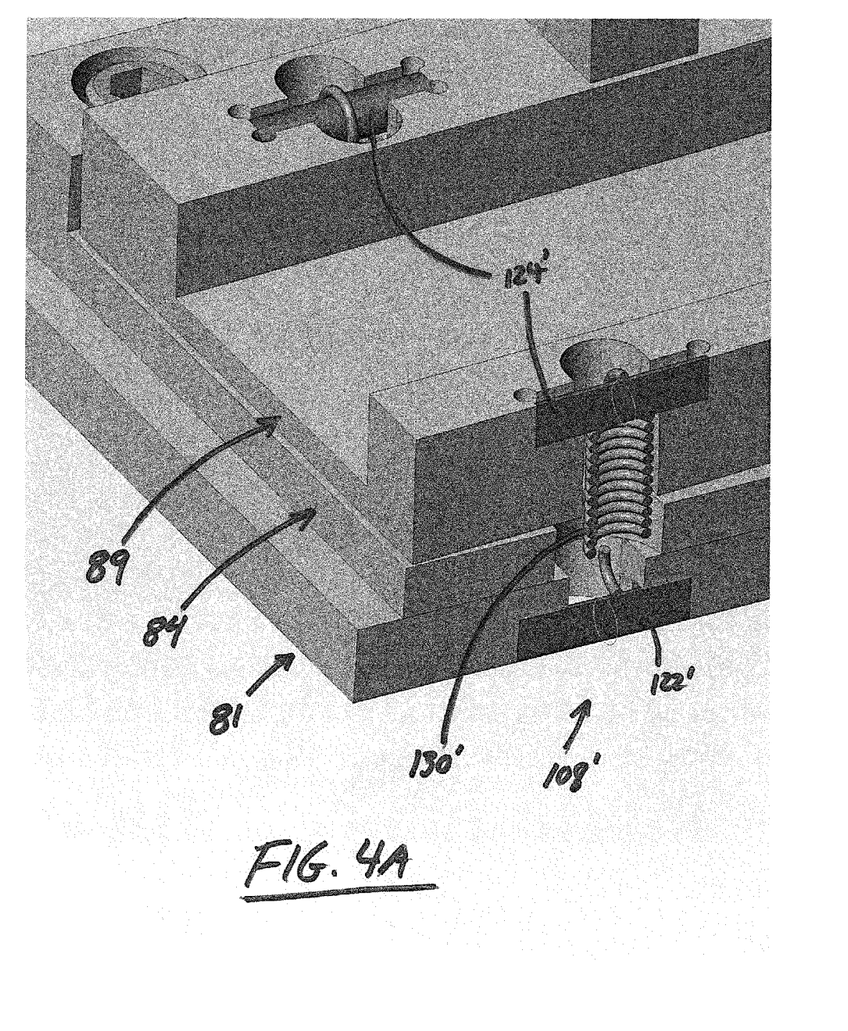
FIG. 4A is a fragmentary perspective view of a portion of the periscope tower according to another implementation.

In another implementation, and with reference to FIG. 4A, a preloader 108' may include a tension spring 130' coupled to the mounting plate 81 (or to the tower base 84) and to the pivotable frame base 89, impose a bias force on the frame base 89 on a side of the axis A opposite of the adjuster 106. For example, the spring 130' may include one end coupled to an attachment member 122' that may be located in a corresponding relief in a bottom surface of the plate 81, and another end coupled to another attachment member 124' that may be located in a corresponding relief in a top surface of the base 89. The preloader 108' may be located on either side of the tower as shown in FIG. 4A.

Referring to FIG. 3, the periscope tower 80 further may include a third level 130 of the frame 86 disposed between the first and second levels 88, 90, and that may include a third level member or plate 131 coupled to and between the uprights 87 in any suitable manner. The first collection mirror 74 may be carried by the frame 86 at the second level 90, and the second collection mirror 76 and the second collector 78 may be carried by the frame 86 at the third level 130. For example, the mirror 76 may be carried by the plate 131, and the collector 78 may be carried by one of the uprights 87.

The microscope 10 also may include the scanning tower 82 that may be used to receive the light beam directly from the source 22 or indirectly via the periscope tower 80, collect light reflected from the material under investigation, transmit the reflected light, and to conduct SPM on the material. The scanning tower 82 may carry the material under investigation, the peripheral optic 16, the SPM hardware 14, the transmissive objective 64, and the reflective optic 66, and the movable illumination mode mirror 68.

Figure 5:
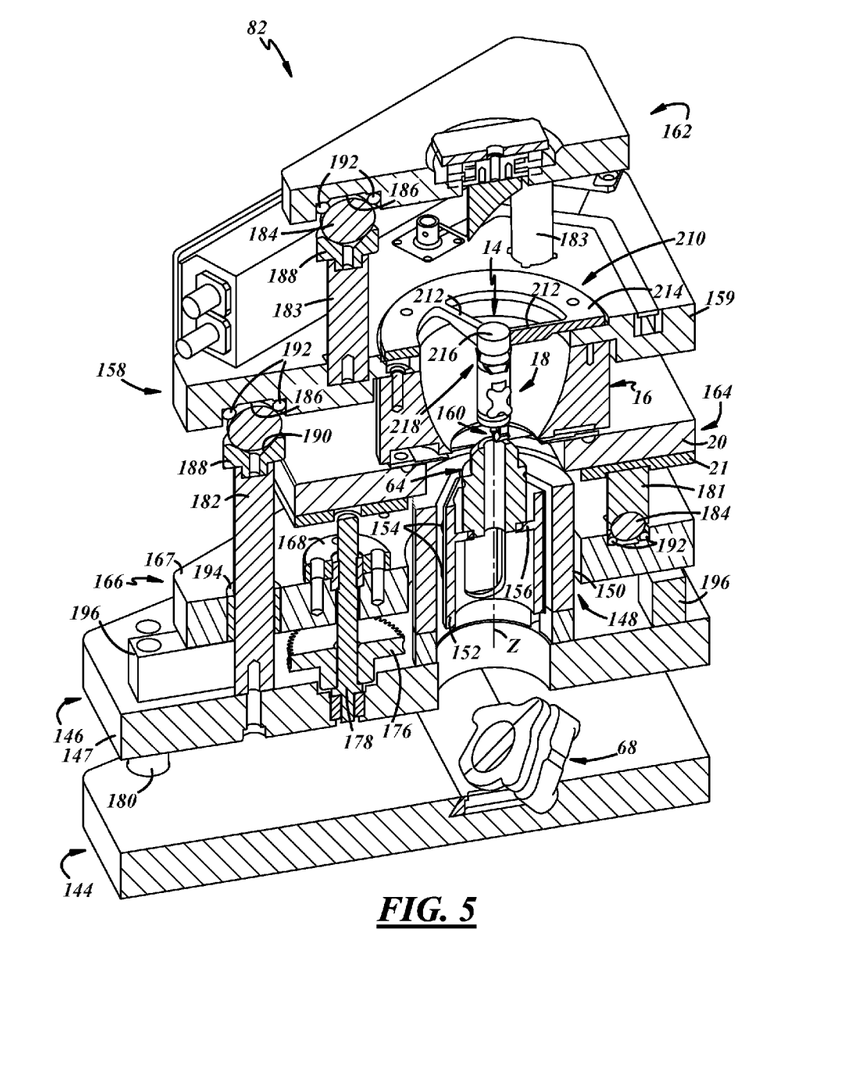
FIG. 5 is a fragmentary perspective view of a scanning tower of the hardware shown in FIGS. 2 and 3.

Referring to FIGS. 3 and 5, the tower 82 may include a base 144, and a transmissive objective level 146 supported above the base 144 and carrying the transmissive objective 64 (FIG. 1), which may be adjustable along a Z axis and may be part of a nanopositionable optical device 148. As shown in FIG. 5, the device 148 may include a housing 150 having a longitudinal axis (Z axis), and a slider 152 disposed in the housing 150 and movable along the longitudinal axis. As shown in FIG. 3, a housing plate 151 may be coupled to the housing 150 over an aperture (not shown) in one side thereof to impose a bias force on the slider 152. A plurality of nanopositioners, for instance piezoelectric elements 154, may be disposed between surfaces of the housing 150 and the slider 152 (and between the plate 151 and the slider 152) to move the slider 152 relative to the housing 150. Accordingly, the slider, piezoelectric elements, and the housing may be of large PAN motor construction. The optic 64 may be carried by the slider 152 in any suitable manner. For example, a rear portion of the optic 64 may be piloted into a recess of a transversely extending flange 156 of the slider 152, and may be fastened, welded, adhered, or the like to the corresponding slider flange 156. The optic 64 may include a focusable lens, for example, a ZEISS PLAN-APOCHROMAT with 100× magnification and 1.4 NA with differential interference contrast.

The tower 82 also may include an integration level 158 supported above the transmissive objective level 146 and carrying the peripheral optic 16 and the SPM scanning head 18, wherein the head 18 is disposed within the peripheral optic 16, is adjustable along the Z axis, and has an SPM probe 160 with a tip positionable to a near focal point of the peripheral optic 16.

The tower 82 also may include a reflective optic level 162 supported above the integration level 158 and carrying the reflective optic 66, and a scanner stage level 164 supported between the transmissive objective level 146 and the integration level 158 and carrying the SPM scanning stage 20 adjustable along the Z axis. The peripheral optic 16 may extend from the integration level 158 toward the scanner stage level 164 with a space between a lower end of the peripheral optic 16 and an upper surface of the scanning stage 20.

The tower 82 further may include a scanner adjustment level 166 disposed between the transmissive objective level 146 and the scanner stage level 164 and supporting the scanner stage level 164. The scanner adjustment level 166 may include an axial adjustment member 168. With reference to FIG. 3, an adjustment level drivetrain 170 may be coupled to the axial adjustment member 168 to impart motion to the scanner stage level 164 along the Z axis. The drivetrain 170 may include a motor 172, and a worm drive gear 174 coupled to the motor 172 and including a worm driven gear 176 in mesh with the drive gear 174 and rotatably carried by the level 146, for example, via a member or plate 147. An adjustment shaft 178 may be fixed to the driven gear 176 and may include an externally threaded portion to threadingly engage the axial adjustment member 168, which may include a corresponding internally threaded portion. Accordingly, the drivetrain 170 may be activated to provide coarse positioning of the scanner stage level 164 (and the material) along the Z axis, whereas the scanner stage 20 may be activated to provide fine positioning of the material along the Z axis. For example, coarse positioning may include between 5,000 and 50,000 nanometers/second, and fine positioning may include between 0.05 and 5 nanometers/second. In another example, coarse positioning may include step sizes of 2-40 microns, more specifically about 5 microns. The coarse positioning step size is preferably smaller than the total Z-range of the fine positioning, for example 50 microns. The fine positioning step size may include 0.1 to 200 nm. According to a method implementation, if it is determined that a Z position setpoint criterion is met during fine positioning, then fine positioning is complete. If not, then the SPM scanning stage 20 is retracted along the Z-axis, and coarse positioning is carried out according to a coarse step, and then the fine positioning is attempted again using the SPM scanning stage 20. This is repeated until the sample material reaches the probe tip. Any suitable setpoint criterion may be used, including tip/sample interaction, optical verification, and/or the like.

The tower 82 may be constructed and arranged in any suitable manner. For example, the transmissive objective level 146 may be supported above the base 144 with shafts 180 that may be fixed to corresponding plates 147, 145 of the level 146 and the base 144 in any suitable manner. Also, the integration level 158 may be supported above the transmissive objective level 146 by kinematic mounts, which may include shafts 182 coupled to the plate 147, spherical members 184 received in sockets 186 of an integration level plate 159, and collars 188 that may have V-shaped sockets 190 to receive the spherical members 184. In one embodiment the shafts 182 and collars 188 may be integral or unitary. The sockets 186 may include solid cylinders 192 carried therein. The cylinders 192 may be soldered, welded, adhered, or coupled in any other suitable manner in the sockets 186. The engagement of the spherical members 184 with the cylinders 192 ensure good repeatable mounting. Similarly, the reflective optic level 162 may be supported above the integration level 158 by kinematic mounts including shafts 183 coupled to the integration level plate 159, and the rest of the kinematic mount features as shown. Likewise, the scanner stage level 164 may be supported above the adjustment level 166 by kinematic mounts, but in reverse orientation, and including shafts 181 that may be coupled in any suitable manner to a scanner adapter plate 21 which, in turn, may be coupled to the scanner 20 in any suitable manner. Finally, the adjustment level 166 may be supported above transmissive objective level 146, for example, via bushings 194 that may be carried by an adjustment level plate 167 for slidable mounting to the shafts 182. The plate 167 may be adjusted along shafts 182 via the drivetrain 170, and stops 196 may be disposed between the plates 147, 167 to limit motion therebetween.

Figure 6:
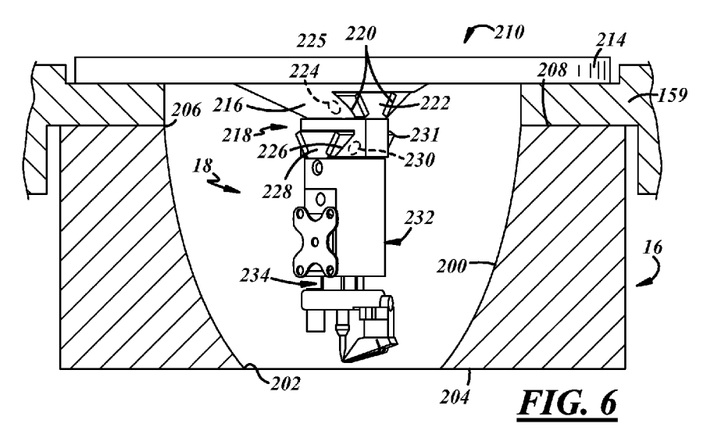
FIG. 6 is a fragmentary sectional view of a portion of the scanning tower shown in FIG. 4, illustrating a scanning head of the microscope of FIG. 1 according to an illustrative embodiment.

With reference to FIG. 6, the peripheral optic 16 may include a concave circumferential mirror having a reflective surface of revolution 200. For example, the concave circumferential mirror may include an elliptical mirror. In any case, the concave circumferential mirror has a minor diameter 202 at a first end 204 and a major diameter 206 at a second end 208.

The SPM scanning head 18 may be suspended from a location relatively proximate the first end 204 of the peripheral optic 16, and distal the second end 208 of the peripheral optic 16, and so as to extend toward the second end 208. In one illustrative implementation, the SPM scanning head 18 may be suspended from a spoked member 210 having spokes 212 (FIG. 5) and spaces circumferentially between the spokes 212 through which light may pass. The spoked member 210 may include a radially outer portion or rim 214 carried proximate the major diameter 206 of the optic 16, a radially inner portion or hub 216 carrying the SPM scanning head 18, and the spokes 212 extending between the hub and rim 214, 216.

The SPM hardware 14 also may include a modular mount 218 to suspend different types of SPM scanning heads into the peripheral optic 16. The modular mount 218 may allow the SPM scanning head 18 to move in two orthogonal directions, for example, along an X' axis and a Y' axis.

In a first illustrative implementation shown in FIG. 6, the modular mount 218 may include a dovetail mortise 220 in the hub 216 of the spoked member 210, and a dovetail tenon 222 disposed in the dovetail mortise 220 and nanopositioning elements 224, 225 disposed between the dovetail tenon 222 and mortise 220. The modular mount 218 also may include a second dovetail mortise 226, for example, in the dovetail tenon 222, and a second dovetail tenon 228 disposed in the second dovetail mortise 226, and additional nanopositioning elements 230, 231 disposed between the second dovetail tenon 228 and mortise 226. Accordingly, the modular mount 218 may include nanopositioners stacked one above the other along the Z axis. The various nanopositioning elements may include piezoelectric elements. The scanning head 18 may include a housing 232 coupled in any suitable manner to the dovetail tenons 228, 222, and an armature assembly 234 carried by the housing 232.

Figure 7:
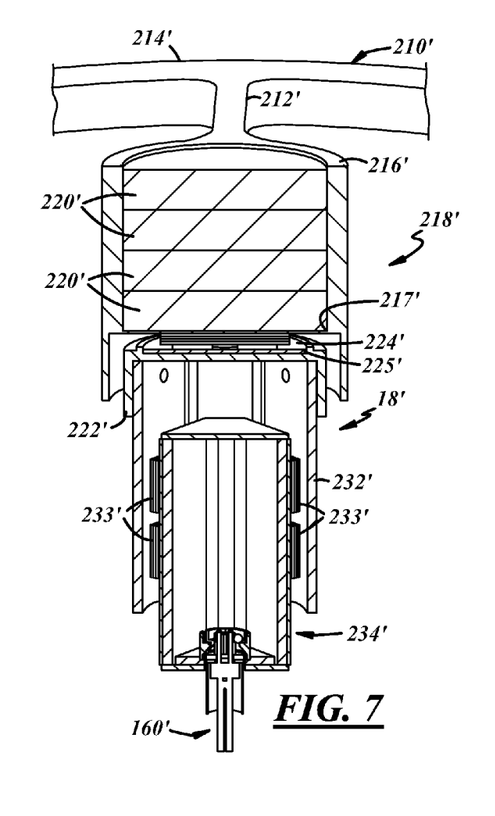
FIG. 7 is an enlarged, fragmentary, perspective, sectional view of a scanning head of the microscope of FIG. 1 according to another illustrative embodiment.

In a second illustrative implementation shown in FIG. 7, a modular mount 218' may include a spoked member 210' having a rim 214' and a hub 216' that carries at least one magnet 220' on one side of the hub 216', for example, in a pocket 217' thereof. The mount 218' also may include a ferrous member 222' on an opposite side of the hub 216' coupled to an SPM scanning head 18', and one or more nanopositioning elements 224', 225', for example piezoelectric elements, disposed between the hub 216' and the ferrous member 222'. The scanning head 218' may include a housing 232' coupled in any suitable manner to the ferrous member 222', an armature assembly 234' carried by the housing 232', and nanopositioning elements 233' therebetween. The head 18' may include a tuning fork type of probe 160'.

Figure 6A:
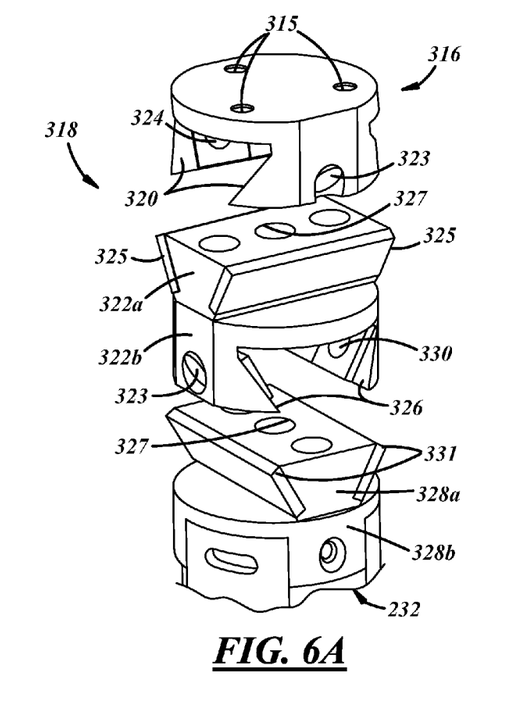

In a third illustrative implementation shown in FIG. 6A, a modular mount 318 may include a first mortise member 316 that may be coupled to the hub 214 of the spoked member 210 (FIG. 6) and may have a dovetail mortise 320. The member 316 may be fastened to the hub 214 by fasteners (not shown) that may extend through passages 315 in a planar portion of the member 316. The modular mount 318 also may include a dovetail tenon 322a disposed in the dovetail mortise 320 and nanopositioning elements 324, 325 disposed between the dovetail tenon 322a and mortise 320, and magnets 323 corresponding to the nanopositioning elements and disposed in corresponding pockets on either side of the member 316 to provide a preload on the elements 324, 325. The magnets 323 may have operational axes that may be perpendicularly oriented with respect to the nanopositioning elements 324, 325, and the magnets 323 may be press fit, adhered, or coupled in any other suitable manner to the member 316.

The modular mount 218 further may include a second mortise member 322b that may be coupled to the dovetail tenon 322a, and may include a dovetail mortise 326. The tenon 322a may be separately coupled to the member 322b, for example, by fasteners (not shown) that may extend through passages 327 in the tenon 322a, or may be integrally coupled therewith. The modular mount 318 also may include a dovetail tenon 328a disposed in the dovetail mortise 326 and nanopositioning elements 330, 331 disposed between the dovetail tenon 328a and mortise 326, and magnets 323 corresponding to the nanopositioning elements and disposed in corresponding pockets on either side of the member 322b to provide a preload on the elements 330, 331. The magnets 323 may have operational axes that may be perpendicularly oriented with respect to the nanopositioning elements 330, 331, and the magnets 323 may be press fit, adhered, or coupled in any other suitable manner to the member 322b. The tenon 328a may be separately coupled to the member 328b, for example, by fasteners (not shown) that may extend through passages 327 in the tenon 328a, or may be integrally coupled therewith. The modular mount 218 further may include a head coupling member 328b that may be coupled to the dovetail tenon 328a or may be unitary therewith, and may include an end coupled to the SPM head housing 232. The member 328b may be fastened to the housing 232 in any suitable manner, or otherwise coupled thereto in any suitable manner.

Figure 8:
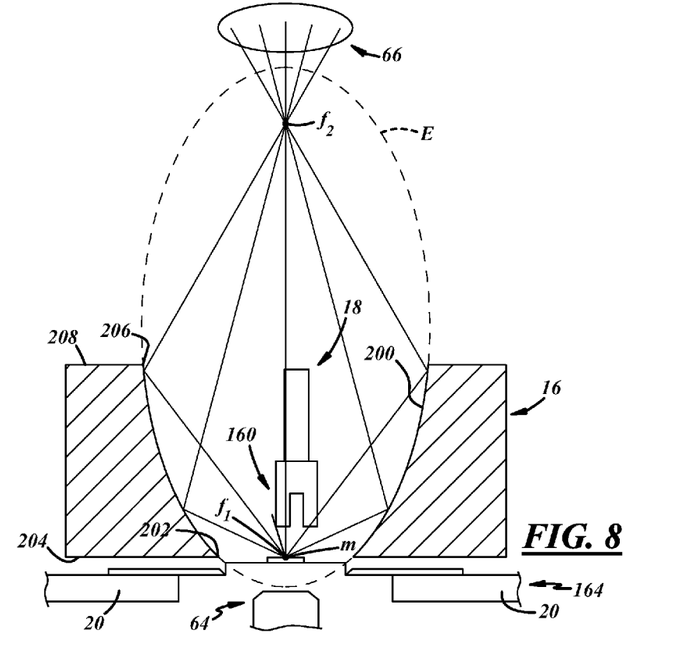
FIG. 8 is a schematic view of a reflection illumination path and reflection collection path of the microscope of FIG. 1.

Referring to FIG. 8, the SPM hardware 14 includes the SPM scanning head 18 having the SPM probe 160 and the material M disposed in the peripheral optic 16. The peripheral optic 16 includes a first or near focal point $f_1$ nearest the ellipsoidal mirror (e.g. near the minor diameter thereof), a second or far focal point $f_2$ furthest from the ellipsoidal mirror, and a theoretical ellipse E established by the reflective inner surface 200 of the optic. The transmissive objective 64 may or may not extend into the ellipse E, and the reflective optic 66 may be located outside of the ellipse E, but their foci may overlap in space. The transmissive objective 64 and the reflective optic 66 may transmit light along their illumination paths and/or receive reflective light along their reflection paths.

The SPM head 18 and the SPM scanning stage 20 supporting the material M each may be piezo-driven to allow positioning of the tip of the SPM probe 160 to be positioned to the first focal point $f_1$ and/or to allow positioning of the material to a two-dimensional plane associated with the first focal point $f_1$. The SPM hardware 14 enables positioning of the SPM probe tip within a focused radiation field so that polarization of an incident radiation field is aligned with respect to a longitudinal axis of the SPM probe tip, for example, within a predetermined angular tolerance, for instance +/−10 degrees.

Figure 9:
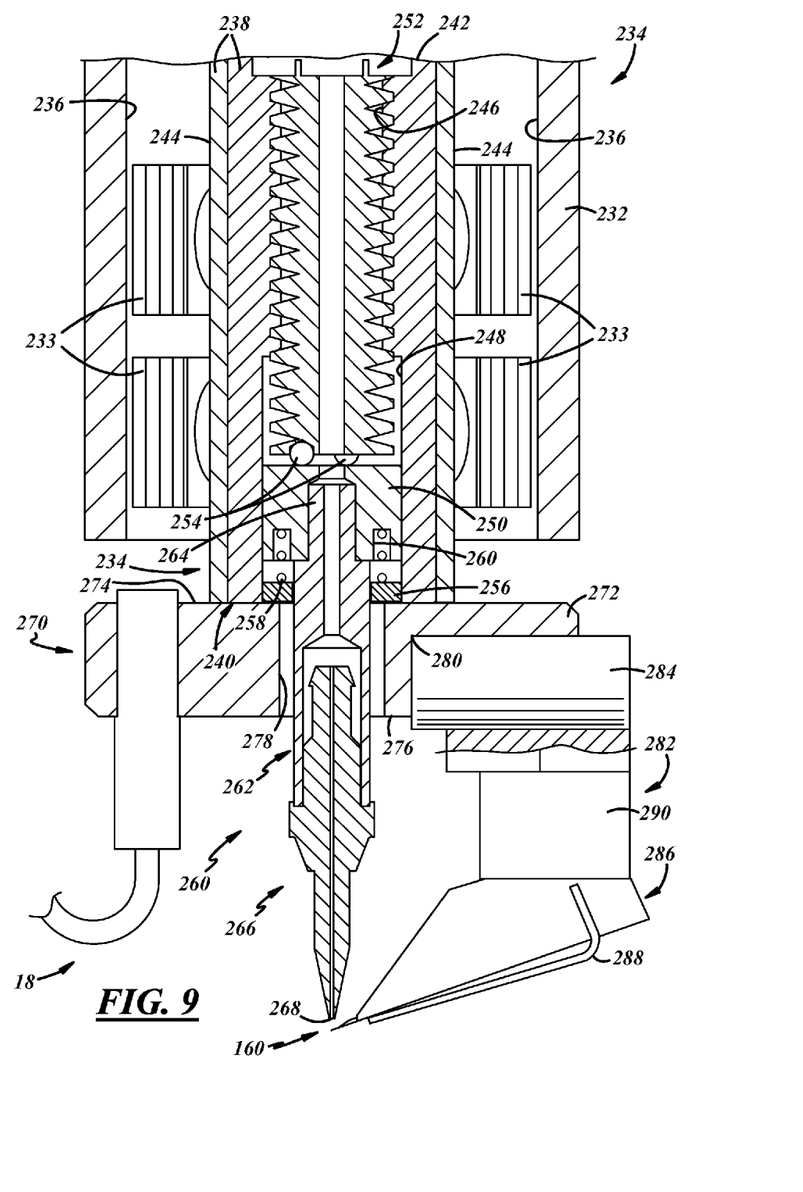
FIG. 9 is an enlarged fragmentary sectional view of a scanning head of the microscope of FIG. 1 according to an illustrative embodiment.

Referring to FIG. 9, the SPM scanning head 18 may include the housing 232 having an interior with internal piezo surfaces 236, piezoelectric elements 233 disposed in the interior of the housing 232 along the piezo surfaces 236, and the armature assembly 234 that may include an armature 238 movable within the housing 232 along a longitudinal axis. The armature 238 may include a first end 240, a second end 242 disposed axially opposite the first end 240, and external piezo surfaces 244 corresponding to the internal piezo surfaces 236 of the housing 232 and in contact with the piezoelectric elements 233. The armature 238 also may include a threaded through bore 246 in the second end 242, a counterbore 248 in the first end 242, a slider 250 disposed in the counterbore 248, an adjustment screw 252 disposed in the threaded through bore 246 of the armature 238 and in contact with the slider 250, three or more spherical members 254 disposed in corresponding pockets of the screw 252, an annular plate or washer 256 disposed at the first end 240 of the armature 238 in the counterbore 248, and a spring 258 disposed in the counterbore 248 and biased against the slider 250, for example, in an annular pocket 260 thereof and against the washer 256.

The SPM scanning head 18 also may include a fiber optic ferrule 260. The ferrule 260 may include a mounting portion 262 that may include a stem 264 that may be coupled to the slider 250, for example by friction fit in a counterbore thereof or in any other suitable manner. The ferrule 260 also may include a tip portion 266 coupled to the mounting portion in any suitable manner and including a ferrule tip 268. Axial positioning of the ferrule tip 268 relative to the probe 160 may be adjustable by movement of the adjustment screw 252 of the armature assembly 234.

The SPM scanning head 18 further may include a probe mount 270 that may include a support 272 having a first surface 274 coupled to the first end 240 of the armature 238, a second surface 276, and a throughbore 278 between the surfaces 274, 276 through which extends the fiber optic ferrule 260. The second surface 276 may include a cylindrical socket 280 that may extend transversely, for example, radially, with respect to the throughbore 278.

The SPM scanning head 18 additionally may include a cantilever probe assembly 282 coupled to the probe mount 270. For example, the assembly 282 may include a cylindrical member 284 for self-centering magnetic coupling to the cylindrical socket 280 of the probe mount 270. The probe mount 270 and the cylindrical member 284 are composed of suitable corresponding magnetic/ferrous materials. The assembly 282 also may include a probe holder 286 that may include a clip 288 to hold the probe 160 in place, and a nanopositioner 290 coupled between the cylindrical member 284 and the probe holder 286. Positioning of the probe tip is adjustable by movement of the cylindrical member 284 in the cylindrical socket 280 of the magnetic mount 270, and/or by actuation of the nanopositioner 290. The nanopositioner 290 may include one or more piezoelectric elements for fine positioning of the probe 160, for example, along the Z axis.

With reference to FIG. 10, a computing apparatus 300 may be used in conjunction with the rest of the microscope 10 to carry out various aspects of the presently disclosed methods. In one example, the computing apparatus 300 may receive input data and instructions from a user, process the received input in light of stored software and/or data, and transmit output signals to various devices of the microscope 10, like the light source origin, the MCBE module, steerable mirrors, the drivetrain motor, the nanopositioners, and the like. Conversely, in another example, the computing apparatus 300 may receive input signals from various devices of the microscope 10, like the collectors, light sensors or imaging devices, optics/lenses, the SPM scanning probe, fiber optics, and the like. Cables, wires, and other wired or wireless connections within and between the computing apparatus and the microscope 10 are well known to those of ordinary skill in the art and not illustrated in the drawing figures.

The computing apparatus 300 may process the received input signals in light of stored data and software, and transmit output data to the user. The computing apparatus 300 may include, for example, an electrical circuit, an electronic circuit or chip, and/or a computer. The computing apparatus 300 may be distributed among separate devices or may be integrated. At least the SPM portion of the microscope 10 may include at least some portions of the system disclosed in U.S. Patent Application Publication 2012/0005621, the contents of which is incorporated herein by reference in its entirety.

In the computer embodiment, the computing apparatus 300 generally may include memory 302, a processor 304 coupled to the memory 302, one or more interfaces 306, one or more input devices 308, and/or one or more output devices 310. Of course, the computing apparatus 300 further may include any ancillary devices, for example, clocks, internal power supplies, and the like (not shown). Although not shown, the computing apparatus 300 and the various microscope devices may be supplied with electricity by any suitable power supply (ies), including an external power supply, for example, an AC to DC transformer, one or more batteries, fuel cells, and/or the like.

The input devices 308 and output devices 310 may include various devices of the microscope 10, for example, the light source origin, the MCBE module, steerable mirrors, the drivetrain motor, the nanopositioners, the collectors, light sensors or imaging devices, optics/lenses, the SPM scanning probe, fiber optics, and the like. The devices 308, 310 may be used to receive or transmit any suitable user input or output, whether tactile, audible, and/or visual. The input devices may include peripheral input devices or user input devices, for example, a pointing device (e.g., a mouse, trackball, pen, touch pad, touch screen, joystick, and the like), keyboard, microphone, camera, and/or the like. The input devices may be used to enter any suitable commands, instructions, data, information, signals, and the like into the processor. The output devices may include user output devices, for example, audio speakers or earphones, or a monitor or any other type of display device, or may include peripheral output devices, for example, a printer, a modem or any other communication adapter, and/or the like.

The interfaces 306 may include internal and/or external communication interfaces and may include wired and/or wireless devices. For example, the interfaces may include an internal bus, which may provide for data communication between the processor, memory, and/or other interface elements of the computing apparatus. In another example, the interfaces may include an external bus for data communication between elements of the computing apparatus 300 and peripheral devices, the devices of the microscope 10, and the like. The interfaces may include one or more of any of several types of bus structures, including a memory bus or memory controller, a peripheral bus, an accelerated graphics port, a local or processor bus, and using any of a variety of bus architectures. Also, the interfaces may include analog-to-digital or digital-to-analog converters, signal conditioners, amplifiers, filters, other electronic devices or software modules, and/or any other suitable interfaces. The interfaces may conform to, for example, RS-232, parallel, small computer system interface, universal serial bus, and/or any other suitable protocol(s). The interfaces may include circuits, software, firmware, and/or any other device to assist or enable the computing apparatus 300 in communicating internally and/or externally with other devices.

The processor 304 may process data and execute instructions that provide at least some of the functionality for the microscope 10. As used herein, the term instructions may include, for example, control logic, computer software and/or firmware, programmable instructions, or other suitable instructions. The processor may include, for example, one or more microprocessors, microcontrollers, discrete logic circuits having logic gates for implementing logic functions on data signals, application specific integrated circuits with suitable logic gates, programmable or complex programmable logic devices, programmable or field programmable gate arrays, and/or any other suitable type of electronic processing device(s).

The memory 302 may include any computer readable medium or media configured to provide at least temporary storage of at least some data, data structures, an operating system, application programs, program modules or data, and/or other computer software or computer-readable instructions that provide at least some of the functionality of the system and that may be executed by the processor 304. The data, instructions, and the like may be stored, for example, as look-up tables, formulas, algorithms, maps, models, and/or any other suitable format.

The memory 302 may be in the form of removable and/or non-removable, volatile memory and/or non-volatile memory. Illustrative volatile memory may include, for example, random access memory (RAM), static RAM (SRAM), dynamic RAM (DRAM) including synchronous or asynchronous DRAM, and/or the like, for running software and data on the processor. By way of example, and not limitation, the volatile memory may include an operating system, application programs, other memory modules, and data. Illustrative non-volatile memory may include, for example, read only memory (ROM), erasable programmable ROM (EPROM), electrically erasable programmable ROM (EEPROM), dynamic read/write memory like magnetic or optical disks or tapes, and static read/write memory like flash memory, for storing software and data. Although not separately shown, the computer may also include other removable/non-removable volatile/non-volatile data storage or media. For example, the other media may include dynamic or static external storage read/write device(s).

The methods disclosed herein or parts thereof can be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program product can be executed on one computer or on multiple computers in communication with one another.

The program(s) can be embodied on non-transitory computer readable media, which can include one or more storage devices, articles of manufacture, or the like. Example non-transitory computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The non-transitory computer readable medium may also include computer to computer connections, for example, via a network or another communications connection (either wired, wireless, or a combination thereof). Non-transitory computer readable media include all computer readable media, with the sole exception of transitory propagating signals. Any combination(s) of the above examples is also included within the scope of the computer-readable media.

It is, therefore, to be understood that the method(s) can be at least partially performed by any electronic articles and/or devices capable of executing instructions corresponding to one or more steps of the disclosed method(s).

The invention claimed is:

1. A method of operating an integrated optical and scanning probe microscope having optical microscopy hardware including a peripheral optic, a transmissive objective disposed on a first side of the peripheral optic, a reflective optic disposed on a second side of the peripheral optic, a first side illumination path, a second side illumination path, a first side collection path, a second side collection path, a light source to direct light along the first side illumination path, and the microscope also having scanning probe microscopy (SPM) hardware integrated with the optical microscopy hardware to carry out SPM techniques including confocal and near-field optical SPM techniques, wherein the method comprises:
   activating the first side illumination path; and
   simultaneously activating the first and second side collection paths,
   wherein the reflective optic is an off-axis parabolic mirror.

2. A method of operating an integrated optical and scanning probe microscope having optical microscopy hardware including a peripheral optic, a transmissive objective disposed on a first side of the peripheral optic, a reflective optic disposed on a second side of the peripheral optic, a first side illumination path, a second side illumination path, a first side collection path, a second side collection path, a light source to direct light along the first side illumination path, and the microscope also having scanning probe microscopy (SPM) hardware integrated with the optical microscopy hardware to carry out SPM techniques including confocal and near-field optical SPM techniques, wherein the method comprises:
   activating the first side illumination path; and
   simultaneously activating the first and second side collection paths,
   a transmission illumination mode for focusing on a transparent material and a reflection illumination mode for focusing on at least one of the transparent material or an opaque material,
   wherein an illumination mode mirror is disposed on a first side of the transmissive objective and is removable for the reflection illumination mode.

3. The method of claim 2, wherein the confocal SPM technique includes atomic force microscopy (AFM), and the near-field optical SPM technique includes at least one of tip-enhanced Raman spectroscopy (TERS) or apertureless near-field scanning optical microscopy (a-NSOM).

4. The method of claim 2, wherein the transmissive objective is nanopositionable.

5. The method of claim 2, further comprising a transmission illumination mode for focusing on a transparent material and a reflection illumination mode for focusing on at least one of the transparent material or an opaque material.

6. The method of claim 2, wherein a dichroic first collection mirror is disposed optically upstream of the illumination mode mirror, and a dichroic second collection mirror is disposed such that the reflective optic is optically between the peripheral optic and the dichroic second collection mirror.

7. The method of claim 2, wherein a first periscope mirror is disposed optically downstream of the illumination mode mirror along the second side illumination path and a second periscope mirror is disposed optically downstream of the first periscope mirror along the second side illumination path in optical communication with the reflective optic for the reflection illumination mode.

8. The method of claim 7, wherein the first periscope mirror has a reflective surface and is pivotable about an axis that extends along the reflective surface and that is perpendicular to the second side illumination path, and wherein the second periscope mirror is movable along the second side illumination path.

9. A computer program product stored on a computer-readable medium and including instructions executable by a computer processor of a microscope to cause the microscope to implement steps of a method according to claim 2.

10. A computer-controlled microscope, comprising:
at least one input device to receive data;
a memory storing program instructions and data; and
a processor coupled to the input and output device and memory and responsive to the program instructions for causing the computer-controlled system to perform a method according to claim 2.

11. An integrated optical and scanning probe microscope, comprising:
optical microscopy hardware including a peripheral optic; and
scanning probe microscopy (SPM) hardware integrated with the optical microscopy hardware to carry out SPM techniques including confocal and near-field optical SPM techniques, wherein the SPM hardware includes an SPM scanning head disposed within the peripheral optic,
wherein the SPM scanning head is suspended from a spoked member having spaces through which light passes,
wherein the spoked member includes a radially outer portion carried proximate a major diameter end of the circumferential mirror, a radially inner portion carrying the SPM scanning head, and spokes extending between the radially inner and outer portions.

12. The microscope of claim 11, wherein the peripheral optic is a concave circumferential mirror having a reflective surface of revolution.

13. The microscope of claim 12, wherein the circumferential mirror is an elliptical mirror.

14. The microscope of claim 12, wherein the circumferential mirror has a major diameter at a first end and a minor diameter at a second end, and the SPM scanning head is suspended from a location relatively proximate the first end and distal the second end, and extends toward the second end.

15. The microscope of claim 11, comprising a modular mount to suspend different types of SPM scanning heads.

16. An integrated optical and scanning probe microscope, comprising:
optical microscopy hardware including a peripheral optic;
scanning probe microscopy (SPM) hardware integrated with the optical microscopy hardware to carry out SPM techniques including confocal and near-field optical SPM techniques, wherein the SPM hardware includes an SPM scanning head disposed within the peripheral optic and suspended from a spoked member having spaces through which light passes; and
a modular mount to suspend different types of SPM scanning heads, wherein the modular mount includes a first dovetail mortise member having a first dovetail mortise, and a first dovetail tenon disposed in the dovetail mortise and nanopositioning elements disposed between the first dovetail tenon and mortise.

17. The microscope of claim 16, wherein the modular mount also includes a second dovetail mortise member coupled to the first dovetail tenon and having a second dovetail mortise, a second dovetail tenon disposed in the second dovetail mortise, and additional nanopositioning elements disposed between the second dovetail tenon and mortise.

18. An integrated optical and scanning probe microscope, comprising:
optical microscopy hardware including a peripheral optic;
scanning probe microscopy (SPM) hardware integrated with the optical microscopy hardware to carry out SPM techniques including confocal and near-field optical SPM techniques, wherein the SPM hardware includes an SPM scanning head disposed within the peripheral optic and suspended from a spoked member having spaces through which light passes; and
a modular mount to suspend different types of SPM scanning heads, wherein the modular mount includes the spoked member having a hub that carries at least one magnet on one side of the hub, a ferrous member on an opposite side of the hub coupled to the SPM scanning head, and at least one nanopositioning element disposed between the hub and the ferrous member.

19. An integrated optical and scanning probe microscope, comprising:
optical microscopy hardware including a peripheral optic; and
scanning probe microscopy (SPM) hardware integrated with the optical microscopy hardware to carry out SPM techniques including confocal and near-field optical SPM techniques, wherein the SPM hardware includes an SPM scanning head disposed within the peripheral optic,
wherein the optical microscopy hardware includes mode conversion devices including a mode converter to convert a source light beam from linear polarized mode to a radial polarized mode, and at least one off-axis parabolic mirror optically downstream of the mode converter to communicate the polarized light in an optically downstream direction.

20. The microscope of claim 19, wherein the SPM scanning head is suspended from a spoked member having spaces through which light passes.

21. The microscope of claim 19, wherein the SPM hardware includes an SPM scanning head having an SPM probe tip, and an SPM scanning stage for a material sample, wherein the scanning head and the material sample are both disposed within an ellipsoidal mirror, wherein the SPM head and the SPM scanning stage are each piezo-driven to allow at least one of positioning of the SPM probe tip to be positioned to a focal point nearest the ellipsoidal mirror or positioning of the SPM sample to a two-dimensional plane associated with the focal point.

22. The microscope of claim 21, wherein the SPM hardware enables positioning of the SPM probe tip within a focused radiation field so that polarization of an incident radiation field is aligned with respect to a longitudinal axis of the SPM probe tip.

* * * * *